United States Patent [19]

Oldani

[11] Patent Number: 4,576,245
[45] Date of Patent: Mar. 18, 1986

[54] SELF-PROPELLED PEDESTRIAN-CONTROLLED TRACTOR FOR TOWING HELICOPTERS

[76] Inventor: Gaetano Oldani, Via Stromboli, 20, 20089 - Rozzano (Milano), Italy

[21] Appl. No.: 584,997

[22] Filed: Mar. 1, 1984

[30] Foreign Application Priority Data

Mar. 21, 1983 [IT] Italy .............................. 21198/83[U]

[51] Int. Cl.[4] ...................... B62D 51/04; B62D 21/14; B64C 25/50
[52] U.S. Cl. ................................. 180/14.1; 180/19.1; 180/904; 244/50; 280/43.12; 414/426
[58] Field of Search ..................... 180/14.1, 19.1, 904; 414/426, 430, 539; 280/43.12, 43.23; 244/50

[56] References Cited

U.S. PATENT DOCUMENTS

| | | | |
|---|---|---|---|
| 3,049,253 | 8/1962 | Cabral | 180/14.1 |
| 3,854,748 | 12/1974 | Goodacre | 280/43.12 |
| 3,946,886 | 3/1976 | Robinson | 414/430 |
| 4,033,422 | 7/1977 | Benning | 180/14.1 |

Primary Examiner—John J. Camby
Attorney, Agent, or Firm—Bucknam and Archer

[57] ABSTRACT

The tractor comprises a platform mounted on three wheels, one of which is a drive and steering wheel, and having pivotally mounted thereon a saddle member having shaped uprights which form a supporting structure for a hydraulic jack of the double-acting type the piston rod whereof has a yoke attached thereto, the two legs of the yoke being adapted to securely engage with the front wheel of a helicopter to be towed so as to drag the wheel along the saddle member.

1 Claim, 1 Drawing Figure

SELF-PROPELLED PEDESTRIAN-CONTROLLED TRACTOR FOR TOWING HELICOPTERS

BACKGROUND OF THE INVENTION

This invention relates to a self-propelled pedestrian-controlled tractor for towing helicopters.

As is known, helicopters, whether of the skid-mounted or wheel-mounted types, require to be moved to and from, between a hangar and hardstand, or between different areas of a hardstand.

Also known is that to move wheel-mounted helicopters, no specific towing vehicles have been provided heretofore, the operation being performed with the aid of an all-purpose tractor to which a helicopter would be hooked for towing.

However, such procedures can endanger the helicopter integrity owing to the unavoidable transversely applied stresses which are imposed on the axle of its steering wheel.

Furthermore, said axle may also undergo in towing to undesired longitudinal stresses which may harm its structure.

SUMMARY OF THE INVENTION

It is an object of this invention to obviate such prior drawbacks by providing a pedestrian-controlled tractor for towing helicopters, which can tow a helicopter by engaging the front wheel of the latter and without imposing any torsional streses on the axle of said wheel.

A further object of this invention is to provide a pedestrian-controlled tractor which is fully reliable and easy to operate.

It is another object of the invention to provide a pedestrian-controlled tractor which may also be used to tow medium size airplanes.

These and other objects, such as will be apparent hereinafter, are achieved by a self-propelled pedestrian-controlled tractor for towing helicopters, according to the appended claim.

BRIEF DESCRIPTION OF THE DRAWINGS

Further features and advantages of the pedestrian-controlled tractor for towing helicopters, according to this invention, will be more readily understood from the following description of a preferred embodiment thereof, with reference to the accompanying illustrative drawing, where.

DESCRIPTION OF THE PREFERRED EMBODIMENT

Figure 1:
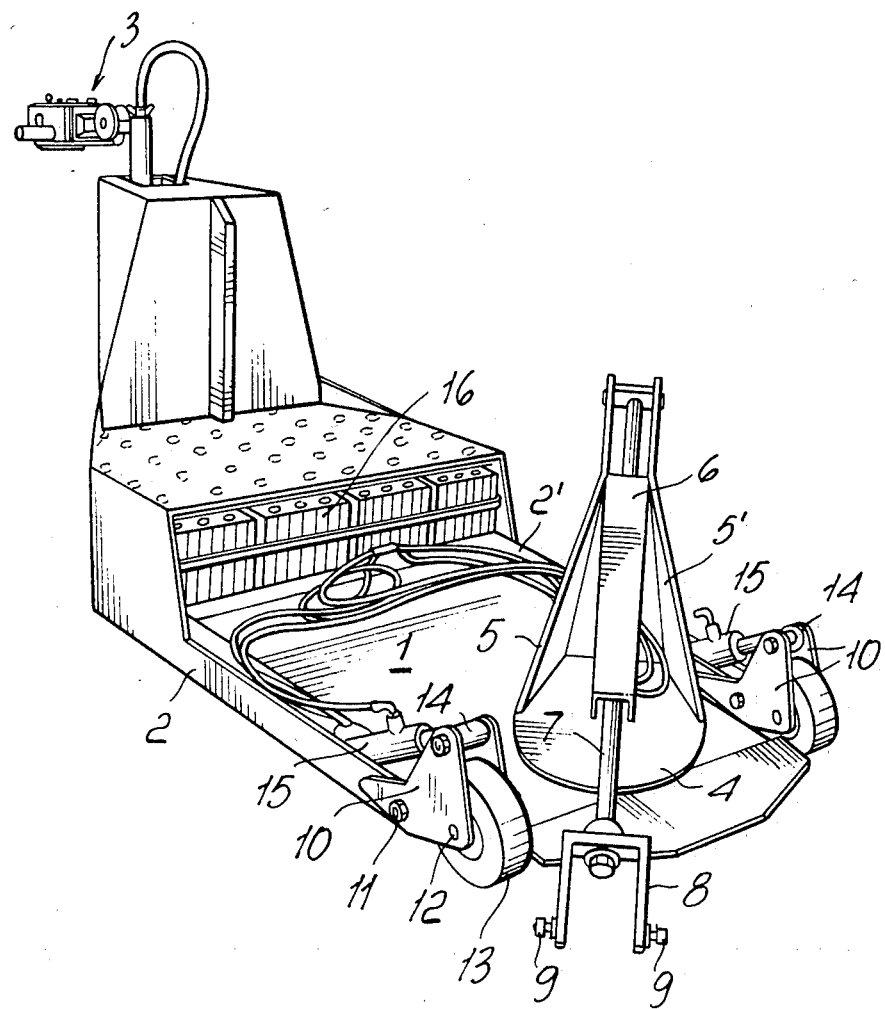
FIG. 1 is a schematical, perspective view of this pedestrian-controlled tractor.

With particular reference to the numerals in the drawing view, a self-propelled pedestrian-controlled tractor for towing helicopters, according to this invention, comprises a platform 1 which is mounted on two peripheral tubes, 2 and 2', forming a supporting frame and being connected at the front to a spring-mounted steering assembly including essentially a drive wheel (not shown) and a steerable control bar 3.

Securely mounted at the center of the platform 1 is a thrust bearing carrying a saddle piece 4, which comprises a concave plate adapted for unrestricted pivotal movement about its vertical axis.

Rigid with said saddle piece are two peripheral shaped uprights, 5 and 5', supporting a double-acting type of hydraulic jack 6, or the like linear motion actuator, the piston rod 7 whereof has a yoke 8. The latter is provided, at the free ends of the yoke legs, with members 9, preferably of the screw type, for jointly securing the front wheel of a helicopter to be towed.

Furthermore, two side wheels 13 are swivel mounted to the rear ends of said supporting frame by means of parallel shaped plates 10 pivoted at 11 and having bearings 12.

Said plates are connected, via an upper crossmember 14, to double-acting hydraulic jacks 15, or the like linear motion actuators. The latter enable in practice the platform 1 to be raised and lowered during the loading and unloading operations of the helicopter front wheel onto and from the platform.

In particular, the electric system for operating the electrohydraulic unit (serving the cited jacks which actuate the wheel-securing yoke and control the rear wheel lift) and front drive wheel of the tractor, is powered from automotive batteries 16 housed in a respective compartment provided in the front portion of the platform 1.

Advantageously, said drive wheel would be equipped with an electromagnetic brake, and can move at a controllable speed under control by an electronic unit the controls whereof are accommodated on the steering bar 3 along with the hydraulic controls.

In practice, after the rear portion of the platform has been lowered to ground level, by means of the jacks 15, the yoke 8 is secured to the helicopter front wheel, and then the yoke 8 is withdrawn by means of the jack 6 to seat said wheel onto the saddle piece 4. Thereafter, the platform is again raised to a horizontal raised position, again by the jacks 15, and the helicopter towed away.

It should be noted in this respect that, owing to said wheel-securing yoke and saddle piece being merely pivoted to the platform 1 about a vertical axis, the likelihood of transversely dirrected or turning forces being imparted to the helicopter wheel is totally eliminated.

Of course, by replacing said wheel-securing yoke, this tractor may also be used for towing medium size airplanes.

It may be appreciated from the foregoing description and accompanying drawing that the pedestrian-controlled tractor of this invention is highly functional in design and practical to use.

I claim:

1. In a self-propelled pedestrian-controlled tractor for towing helicopters comprising essentially a platform mounted on three wheels, one of which is a driving and steering wheel, the two other of said wheels being swivel mounted on the side of said platform by means of pairs of parallel shaped plates being pivotally connected and provided with bearings, said plates being connected by means of an upper cross member to double-acting hydraulic jacks, said drive wheel having an electromagnetic brake and being effective to move at a controllable speed under control by an electronic unit the controls whereof are accomodated on a steerable control bar, the improvement wherein on said platform there is pivotally mounted a saddle plate piece having shaped uprights which form a supporting structure for a double-acting hydraulic jack the piston rod whereof has a yoke having two legs attached thereto, the said two legs of said yoke being adapted to securely engage with the front wheel of a helicopter to be towed so as to drag said wheel along on said saddle plate piece to be pivotally supported thereby about a substantially vertical axis.

* * * * *